April 7, 1970 R. N. FOSTER ET AL 3,504,848
MULTIPLE ZONE AIR HEATING AND COOLING SYSTEM
FOR CHANGE-OVER CONTROL SWITCH
Filed Oct. 25, 1967 3 Sheets-Sheet 1
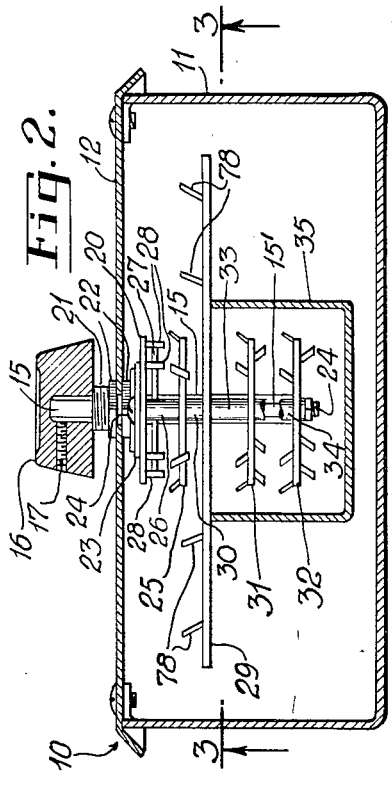
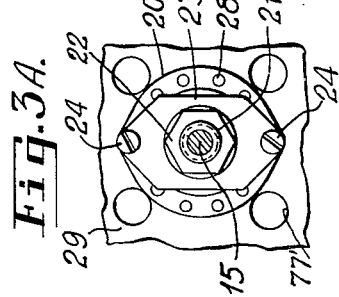
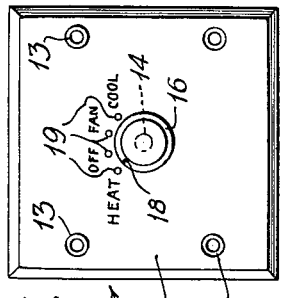
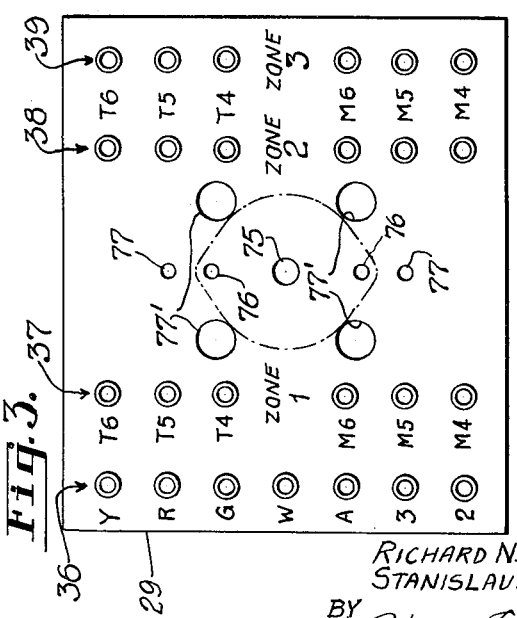
INVENTORS
RICHARD N. FOSTER
STANISLAUS PLEPIS
BY
Howard E. Thompson
ATTORNEY

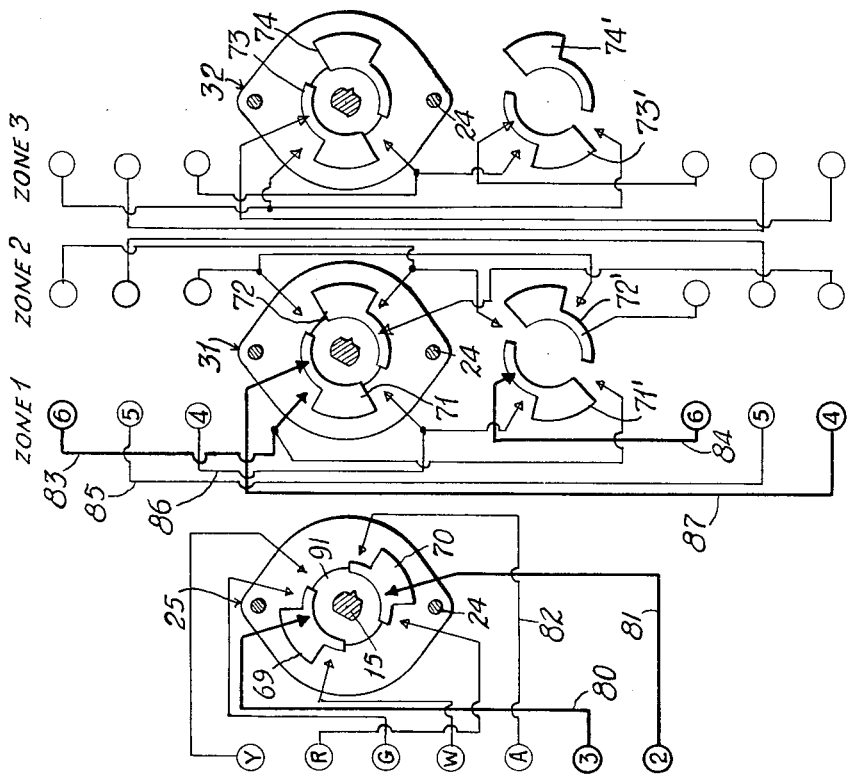
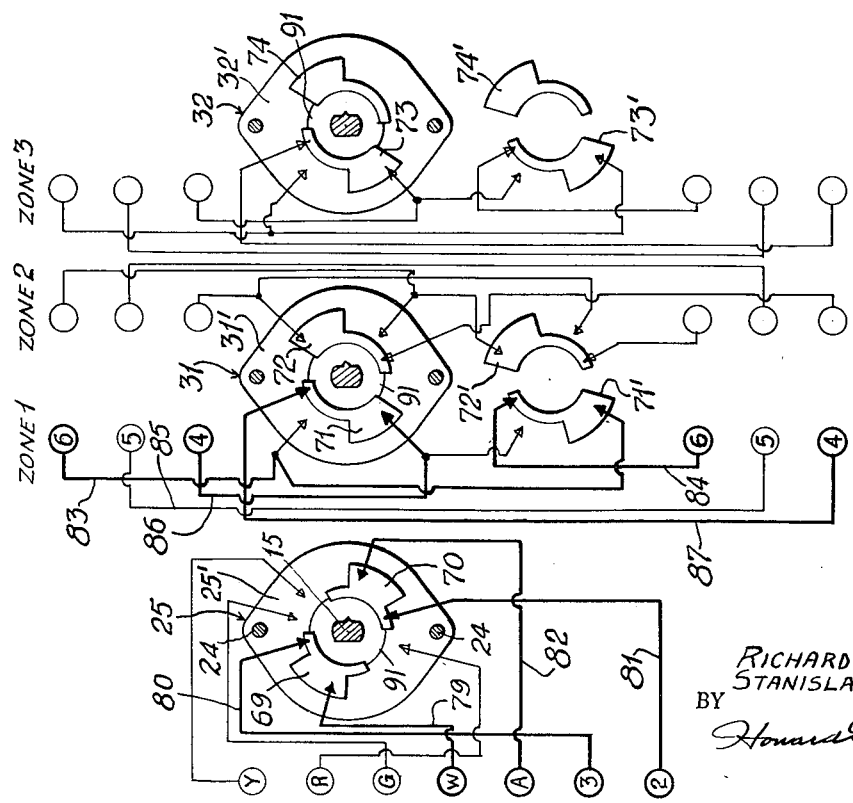

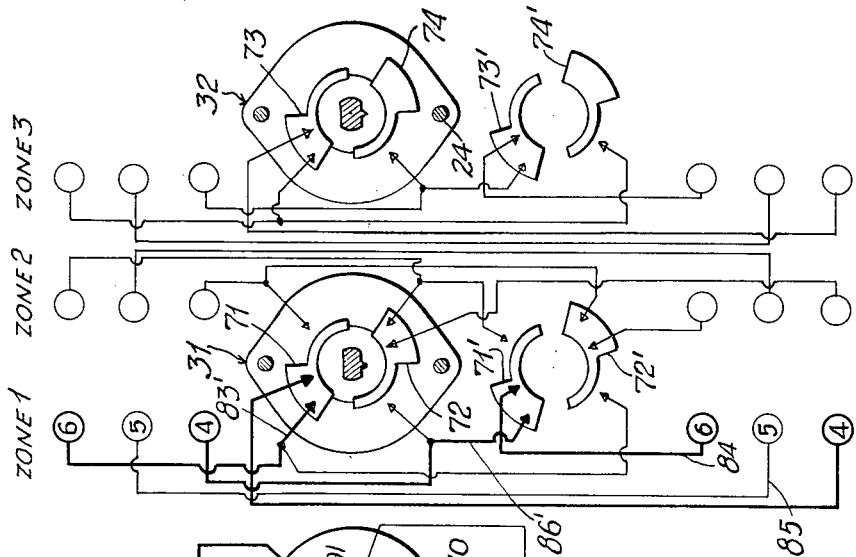
Fig. 8.
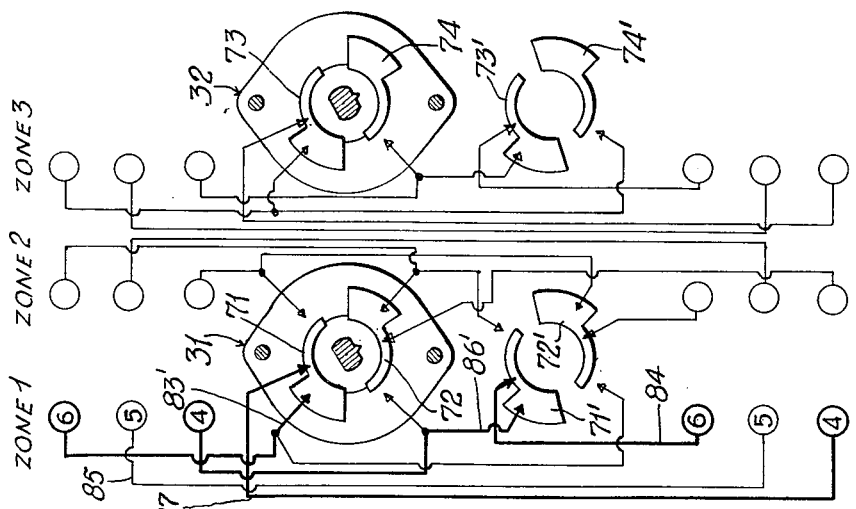
Fig. 7.
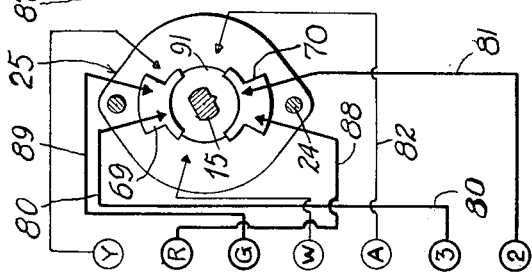
INVENTORS
RICHARD N. FOSTER
STANISLAUS PLEPIS
BY Howard E. Thompson
ATTORNEY

United States Patent Office 3,504,848
Patented Apr. 7, 1970

3,504,848
MULTIPLE ZONE AIR HEATING AND COOLING SYSTEM FOR CHANGE-OVER CONTROL SWITCH
Richard N. Foster, Clifton, and Stanislaus Plepis, Elizabeth, N.J., assignors to Trolex Corporation, Clifton, N.J., a corporation of New Jersey
Filed Oct. 25, 1967, Ser. No. 678,043
Int. Cl. F24f *11/08*
U.S. Cl. 236—1        4 Claims

ABSTRACT OF THE DISCLOSURE

An air heating and cooling system employing a single switch at a control center controlling operation of the system and a multiplicity of zones in the system, wherein the control switch employs a simple, compact assemblage having simultaneously actuated wafer switches controlling the several zones. Further, each zone incorporates a thermostat control in regulating the temperature in each zone and the control switch having an off-setting disengaging the circuits of the entire system.

BACKGROUND OF THE INVENTION

The present invention deals with the provision of a control center, in which a number of different heating zones of a building can be simultaneously controlled in a very simple and compact change-over control switch suitably located in the building where the demands for heating and cooling, as well as fan operation for air circulation, can be controlled and also to completely break the circuit of the system in an off-setting of said control switch.

To applicants' knowledge, a system of the type and kind under consideration, including the center control switch is new and they are not aware of any patents on a system and control switch assemblage of this type and kind.

SUMMARY OF THE INVENTION

By utilizing wafer switches in a simple and economical compact control switch structure, the circuits of a system of the type and kind defined can be economically produced and installed and efficient control and operation of the system provided, particularly in meeting temperature control requirements in each of the zones of the system.

The novel features of the invention will be best understood from the following description, when taken together with the accompanying drawings, in which certain embodiments of the invention are disclosed and, in which, the separate parts are designated by suitable reference characters in each of the views and, in which:

FIG. 1 is a small front view of the control switch.

FIG. 2 is a diagrammatic sectional view through the switch to generally locate the several components and omitting all detail showing of the wires and the wafer switches, including the terminal posts of the panel.

FIG. 3 is a diagrammatic view taken along the line 3—3 of FIG. 2 showing the panel and the markings thereon associated with the terminal posts and identifying the several zones.

FIG. 3A is a view looking at the opposed side of the structure of FIG. 3, omitting parts of the construction.

FIG. 4 is a diagrammatic wiring view of the complete circuit as associated with the terminal posts of FIG. 3.

FIG. 5 is a diagrammatic view illustrating the wafer switches of three zones and for setting at heat control.

FIG. 6 is a view, similar to FIG. 5, showing the setting for off control.

FIG. 7 is a view, similar to FIG. 5, showing the setting for fan control; and

FIG. 8 is a view, similar to FIG. 5, showing the setting for cool control.

Considering FIGS. 1–3 of the drawing, 10 represents the switch assemblage, comprising a box-shaped casing 11, FIG. 2, to the open surface of which is attached a cover 12 having screw apertures 13 for mounting on the casing 11. The cover has a central aperture 14 for mounting on a switch operating shaft 15, FIG. 2, the outer end of the shaft being shaped to form a key coupling with an operating knob 16 fixed to the shaft by a screw 17. The knob 16 has a radial marking 18 to register with four dots or other marks 19 on the outer surface of the cover and associated with these marks, reading from left to right, are the words, HEAT, OFF, FAN and COOL, as clearly noted in FIG. 1, thus identifying the four settings of the switch.

The shaft 15 is supported on the cover. This mounting is thorugh the medium of a circular disc 20, FIG. 2, having a hub portion, in which the shaft 15 is rotated, the hub portion being threaded, as seen at 21, for the mounting of nuts 22 to engage the cover 12. Also supported on the disc 20 is a plate 23, through which and the disc 20 are passed screws 24, note FIG. 3A, for support of a wafer switch 25 spaced from the disc 20 by a sleeve 26, note FIG. 2. Fixed to the shaft 15 is a switch setting disc 27 engaging depending fingers 28 fixed to the disc 20 to provide stop motion on the knob 16 to retain the knob at rest when registering with the respective dots 19, the fingers engaging a notch in the periphery of the disc 27, as will be apparent.

The screws 24 extend beyond the switch 25 and supported thereon is a rectangular binding post supporting plate 29 of insulating material. Suitable spacing means 30 will be provided between the switch 25 and the plate 29.

In FIG. 2, the uppermost screw 24 is broken away to show the flattened or key end portion 15′ of the shaft 15, on which the switch 25 is mounted and the second and third wafer switches 31 and 32 controlling the second and third zones of the system, as shown by way of illustration. All of the switches 25, 31 and 32 are simply diagrammatically outlined and, in FIG. 2, all electrical circuit wires are omitted in order to simplify the illustration. The switch 31 is spaced from the plate 29 by a spacing sleeve 33 and the switch 32 spaced from the switch 31 by a similar sleeve 34. The last named switches are covered by a protective casing 35 suitably secured to the surface of the plate 29.

Considering FIG. 3 of the drawing, here are diagrammatically shown the various terminal posts or sockets with the associated identifications in the left row 36 of seven terminals reading from top to bottom, the identifications Y, R, G, W, A, 3, 2.

To the right of the row 36 is another ZONE 1, row 37 of six sockets having the identifications T6, T5, T4 and M6, M5, M4, respectively.

At the other side of the plate are two similar rows 38, identifying ZONE 2 and 39 identifying ZONE 3, these last two rows having the same identifications of terminals as applied to row 37.

Turning now to the showing in FIG. 4, FIG. 4 is a diagrammatic showing of the wiring diagram and, in this figure, the plate 29 is shown together with the rows of terminals 36, 37, 38 and 39. Connected with the terminal 36 is a wire 40 extending to a COMPRESSOR RELAY 41, from which extends a wire 42 to one terminal of a TRANSFORMER 43, as seen at 44 and to the terminal of a FAN RELAY 45, as seen at 46.

From the other terminal of the FAN RELAY 45 is a wire 47 extending to the POST G and a wire 48 extends from the POST R to another terminal of the TRANSFORMER 43. This now completes the cooling system control circuit.

From the terminal W is a wire 49 which extends to one terminal of another TRANSFORMER 50 and a wire 51 connects the other terminal of 50 with a HEAT RELAY 52, from which extends a wire 53, which is coupled with the terminal A. This completes the furnace circuit controls.

In FIG. 4 are diagrammatically shown motor actuators controlling each of the ZONES, ACTUATOR 54 for ZONE 1, 55 for ZONE 2 and 56 for ZONE 3. A wire 57 from the terminal 3 of the row 36 extends to a terminal 3 on all of the ACTUATORS; whereas, the wire 58 from terminal 2 of row 36 extends to the terminals 2 of all of the actuators. The terminal of each ACTUATOR extends to a DAMPER MOTOR TRANSFORMER 59 and it will also be apparent that a branch 58' of wire 58 extends to the other terminal of 59.

At the upper part of FIG. 4 are shown THERMOSTATS 60 for ZONE 1, 61 for ZONE 2 and 62 for ZONE 3. Circuit wires from these thermostats extend to all of the posts T6, T5, T4 in the rows 37, 38 and 39, respectively, as diagrammatically seen by the wires 63, 64 and 65.

Terminals 4, 5 and 6 on each of the actuators are in circuit respectively with the posts M4, M5, M6 through suitable wiring, diagrammatically seen at 66, 67 and 68.

The foregoing completes the general wiring diagram, except for the wiring of the various wafer switches, which is shown in detail in the four stages of setting of the switch 10 in FIGS. 5, 6, 7 and 8. The showings in these respective figures illustrate the position of the switch elements of the wafer switches 25, 31 and 32. In these figures, the switch plates or elements of the switch 25 are shown at 69 and 70, these being located on one surface only of the switch 25. These switches, in this instance, as well as with the switches 31 and 32, are rotated by the shaft 15, including its extension 15' in the insulated disc 25' of 25 in moving the elements 69 and 70 into different positions, these successive positions being HEAT in FIG. 5, OFF in FIG. 6, FAN in FIG. 7 and COOL in FIG. 8. At this time, it is pointed out that this will also apply to the showing of the switch elements 71, 71'; and 72, 72' of the switch 31 and 73, 73' and 74, 74' of the switch element 32.

With the latter switches, the switch elements are disposed on both side surfaces of the insulation disc 31', 32', in which the elements are rotatably mounted by the shaft 15, 15'. The showing in the lower portion of the switches 31 and 32 in these FIGS. 5 to 8, inclusive show only the switch elements 71', 72', 73', 74', the discs being removed, as the elements would appear on the other surface of the disc, the two elements having the same reference numerals, except for the priming. These elements are insulated one from the other.

Before proceeding to describe the circuits of the various switches 25, 31 and 32, it is well to point out that the MOTOR ACTUATORS 54, 55 and 56, in the respective zones, operate louvers positioned in these zones in accordance with the teachings in Letters Patent 3,251,548 and 3,282,504. For this reason, no specific showing of the louvers is deemed to be necessary. Further, considering FIG. 3 of the drawing, the plate 29 has a central aperture 75 in which the shaft 15 is freely rotatable. The plate 29 also has two holes 76 for reception of the screws 24 and two other holes 77 for receiving the fastening screws or the like in mounting the casing 35 on the plate 29 and holes 77' for reception of circuit wires. Considering FIG. 2 of the drawing, it will appear that extending from a surface of the plate 29 are wire coupling portions of the posts or terminals in each row, as diagrammatically seen at 78, to simplify this wire coupling.

Considering FIG. 5 of the drawing the heat control of the switch 10, it will appear that terminal W contacts with the switch plate 69 through wire 79 and the TERMINAL 3 contacts 69 through wire 80. The circuit entering switch through TERMINAL W from the TRANSFORMER 50 through wire 79 to the switch plate 69 and via wire 80 to the TERMINAL 3, which then is connected to the motor actuator circuit, as seen in FIG. 4, through wire 57 to each of the actuators 54, 55 and 56 and, when any actuator is in open position, back through wire 58 to TERMINAL 2, from TERMINAL 2 through wire 81 to the switch 70, from the switch 70 through wire 82 to TERMINAL A, which connects to the HEAT RELAY 52 via wire 53. When all zone motor actuators are satisfied or in closed position, the circuit through 2, 3 is broken, causing the HEAT RELAY 52 to be de-energized.

In connection with the foregoing operation, it must be kept in mind that there are two phases of operations that could take place. For example, in initially calling for heat by any one zone, the system would be put into operation and that one zone alone will be serviced with heat through the actuator governed by the thermostat control therefor demanding the heat supply. In this instance, the other two zones may not require any supply of heat. As the other alternative, in the event that all zones simultaneously call for a heat supply, it is also conceivable that one zone may shut-off the requirement for heat supply, while the other two zones are still demanding the heat supply, these controls being governed by the thermostats controlling each of the actuators. The foregoing will also apply to the FAN and COOLING operations of the system, later described.

In FIG. 5, the switch 31 is provided for the purpose of reversing the action of the thermostats when the system is switched over from HEAT to FAN to COOL cycle. As shown in FIG. 5, the switch 31 is in heat position, maintaining thermostat terminals 4, 5 and 6 in the same sequence with the MOTOR ACTUATOR TERMINALS 4, 5 and 6. In this position, the circuitry is as follows.

TERMINAL 6 of the thermostat, via wire 83, contacts with the lower plate 71' and travels via wire 84 to MOTOR ACTUATOR TERMINAL 6. THERMOSTAT TERMINAL 5 is directly jumped via wire 85 to MOTOR ACTUATOR TERMINAL 5. THERMOSTAT TERMINAL 4, via wire 86, enters the switch plate 71 and exits via wire 87 to ACTUATOR TERMINAL 4.

In the above switch position, there is no change in continuity between the THERMOSTAT TERMINALS 4, 5 and 6 and the MOTOR ACTUATOR TERMINALS 4, 5 and 6. The switch plate 71 is on the face of the wafer switch; whereas, the switch plate 71' is on the reverse side of the wafer switch. This front and rear switch plate provides all the circuitry necessary for reversing one zone thermostat and an additional switch plate may be incorporated onto the same switch and utilized for reversing the thermostat action of an extra zone, such as ZONE 2. In this connection, it is pointed out that the numerals 4, 5 and 6 in ZONES 2 and 3 have not been included, as they are identical with those of ZONE 2.

By virtue of the provision of the switch plates 72, 72' on the switch 31, the circuit from 31 is transferred to ZONE 2 in the same manner as the circuitry controlling operation of switch 31, as shown by the wiring diagram of FIG. 5. Here again, the switch 32 performs the same function in the provision of the plates 73, 73′. The plates 74, 74′ on the switches 32 will be available for adding additional zones and switches, such as 31 and 32 can be added to service any desired number of zones in a system.

It will be quite apparent that, from the diagrammatic showing in FIG. 6 of the drawing of the switches 25, 31 and 32, the various contact plates of these switches, insofar as the circuit wires are concerned, are now in an OFF position and the complete circuit is opened or broken through all of the switches and the same is inoperative.

Considering FIG. 7 of the drawing, the FAN cycle of the switch 10, it is apparent that the switch in this position has disengaged the previous heat circuitry and is now moved to a new position, so as to energze the FAN, which is not shown, whenever any zone motor is in open position. As shown in FIG. 4, the FAN RELAY 45 is energized by the TRANSFORMER 43, one leg of which, via 48, goes to TERMINAL R shown in FIG. 7. From TERMINAL R, the circuit travels, via wire 88, into switch plate 70 and via wire 81 to terminal 2 which, then traveling through the motor actuator circuitry, would re-enter the circuit via terminal 3 and wire 80 into the switch plate 69 and out wire 89 to terminal G and wire 47, which would complete the circuit to the FAN RELAY 45, note FIG. 4.

Turning to ZONE 1, the action of the thermostats, when in FAN position, is reversed from the action utilized in HEAT position. In other words, the thermostat's system, when in FAN POSITION, will open DAMPERS on a room temperature rise and close DAMPERS on a room temperature drop. In HEAT cycle, just the reverse is true.

Referring to ZONE 1, the THERMOSTAT TERMINAL 6 enters the switch 71, via wire 83′, and exists via wire 87 connecting to MOTOR ACTUATOR TERMINAL 4. The THERMOSTAT TERMINAL 5 is connected directly to MOTOR ACTUATOR TERMINAL 5 through wire 85. THERMOSTAT TERMINAL 4 enters the switch plate 71′ via wire 86′ and exits via wire 84 to MOTOR ACTUATOR TERMINAL 6. It will be noted, now, that THERMOSTAT TERMINALS 4 and 6 are reversed by the switching action, so that what was the terminal 6 connects to MOTOR ACTUATOR 4 and what was thermostat terminal 4 now connects to MOTOR ACTUATOR 6.

The same identical switching action is accomplished in the switches provided for ZONE 2 and ZONE 3 through 72, 72′ and to ZONE 3 through 73, 73′, 74, 74′.

In FIG. 8, we show the circuitry for operating the system in COOLING, wherein both the FAN and COMPRESSOR, not shown, operate simultaneously whenever any zone is calling. As is evident in the drawings, all switch plates are moved one position which does not change any of the circuitry, other than allow the switch plate 69 to also engage wire 90, which completes the circuit to TERMINAL Y and then to COMPRESSOR RELAY 41 through wire 40, FIG. 4, in the same cycle with the FAN RELAY, as shown by the wires 42, 46, as shown in FIG. 4. The thermostats remain in the same cycle as in FIG. 7 and no further description is deemed to be necessary to deal with this showing, as it would apply to ZONE 1, ZONE 2 and ZONE 3.

For clear understanding of the wafer switches, it will appear that, at least in FIG. 5 of the drawing, the insulated discs, to which the switch elements of the switches 25, 31 and 32 are coupled and to which the shaft 15 and/or its extension 15′ are keyed, are identified by the reference character 91 on the respective switches. Further, it will be noted, in considering FIGS. 5–8, inclusive, that the shaft 15 has been diagrammatically illustrated in its several shifted positions in setting of the switch device 10 at each of the four settings at 19 in FIG. 1 of the drawing.

From the foregoing, it will be apparent that, by virtue of the simple and economical switch structure having the controls for HEAT, OFF, FAN and COOL located at any convenient or accessible location, this switch structure fulfills a much needed want in systems of the type and kind under consideration. A system of this type and kind can be controlled in a manner to provide full and complete satisfaction at the various zones controlled by the switch. Automatically, the requirements of HEAT, FAN or COOL in any zone can be fixed by the thermostat for the zone to meet the demands of those occupying that zone which, in many instances, can vary with respect to demands or requirements in another zone of the system for the HEAT, COOL or FAN operations. From this standpoint, in addition to meeting zone requirements, the system can be more economically and practically operated.

The switch device or assemblage may be said to provide a change-over control for systems of the character defined. When the switch is set at HEAT position, zone thermostats will open corresponding zone dampers on temperature drop and close on temperature rise. When one or more dampers are opened, the system HEAT relay is energized. On OFF settings of the switch, all circuits are disengaged and the system and dampers are inoperative. On the FAN setting of the device, zone thermostats will open corresponding zone dampers on temperature rise and close on temperature drop. When one or more dampers are opened, the FAN relay is energized to circulate air to all open zones. Finally, in the COOL setting of the switch device, zone thermostats will open corresponding zone dampers on temperature rise and close on temperature drop. When one or more dampers are opened, both the FAN and COMPRESSOR relays are energized to provide cooling air for all open zones.

Having fully described our invention, what we claim as new and desire to secure by Letters Patent is:

1. A heating and cooling system equipped with an electrical control center, said electrical control center having a switch device for facilitating individual response to said system in a plurality of zones each equipped with a thermostat electrically connected to a damper motor, said switch device having a manually rotatable selector for selecting between an "off" setting and a plurality of operating settings inclusive of which are "heat," "fan" and "cool" settings for said system; a plurality of wafer switches equipped with electrical contacts and mounted for collective coaxial rotation with said selector, said wafer switches being of two types, the electrical contacts of a first type wafer switch being positioned to close the circuits to heating components, to fan components, and to fan and cooling components of said system when rotated to respective "heat," "fan" and "cool" settings of said selector and closing no circuits in the "off" setting thereof, the electrical contacts of a second type wafer switch being positioned to close a circuit between the thermostat and damper motor of an individual zone for operation of the damper motor in one direction in the "heat" setting of said selector and for operating said damper motor in a reverse direction in the "fan" and "cool" settings of said selector.

2. A heating and cooling system as defined in claim 1, wherein said second type wafer switch is equipped with electrical contacts for serving a plurality of zones and, an additional second type wafer switch being employed in said switch device for a system containing more than said plurality of zones.

3. A system as defined in claim 1, wherein each of said wafer switches comprises at least one pair of diametrically opposed and circumferentially movable contact elements and a plurality of fixed electrical contacts adapted to register with said movable elements, each of said movable elements engaging at least two of said fixed electrical contacts in any of the "heat," "fan" and "cool" settings and engaging only one of said fixed electrical contacts in the "off" setting.

4. A heating and cooling system as defined in claim 3, wherein said second type wafer switch has contact elements on both surfaces thereof which are insulated one from the other, one pair of aligned contacts on upper and lower surfaces of said switch serving one zone of said system and a second pair of aligned contacts circumferentially spaced from said first pair serving a second zone of said system.

References Cited

UNITED STATES PATENTS

| 2,196,687 | 4/1940 | Steinfield | 165—22 |
| 2,495,856 | 1/1950 | Markusen | 165—22 |

EDWARD J. MICHAEL, Primary Examiner

U.S. Cl. X.R.

165—22